Nov. 7, 1944.  C. B. NYMAN  2,362,300
FILTER
Filed May 1, 1941  8 Sheets-Sheet 4

Inventor
Carl Bernhard Nyman
By
Williams, Bradbury & Hinkle
Attys.

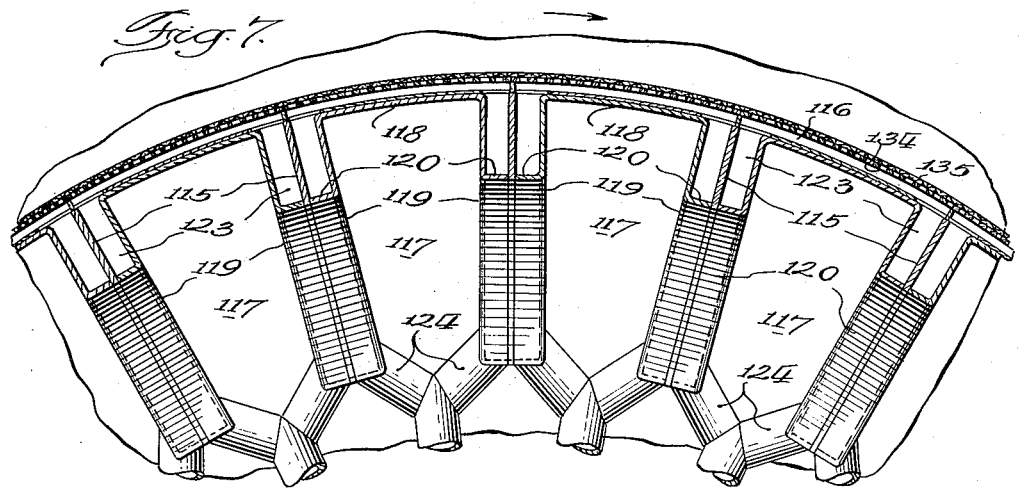
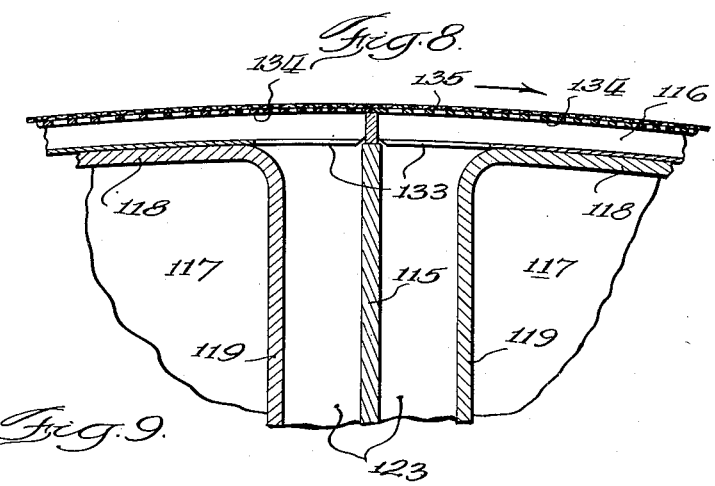
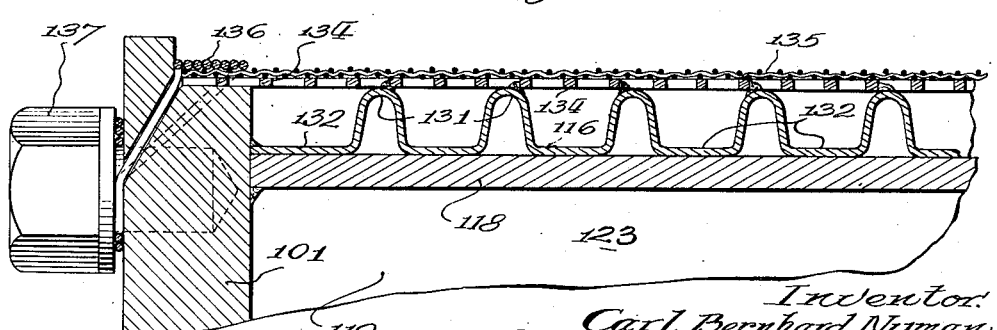

Nov. 7, 1944.   C. B. NYMAN   2,362,300
FILTER
Filed May 1, 1941   8 Sheets-Sheet 6
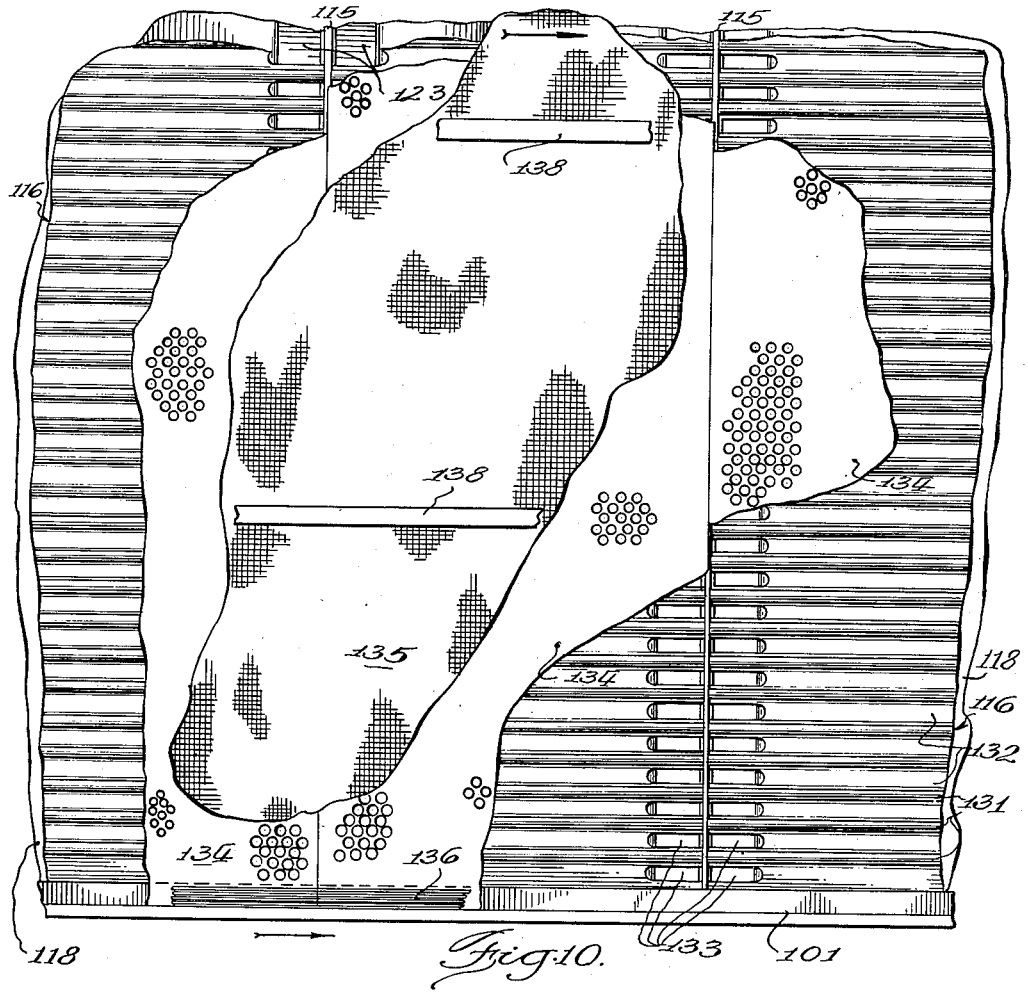
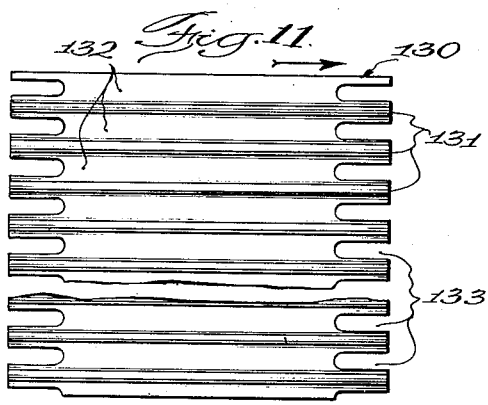
Inventor
Carl Bernhard Nyman
By Williams, Bradbury & Hinkle
Att'ys

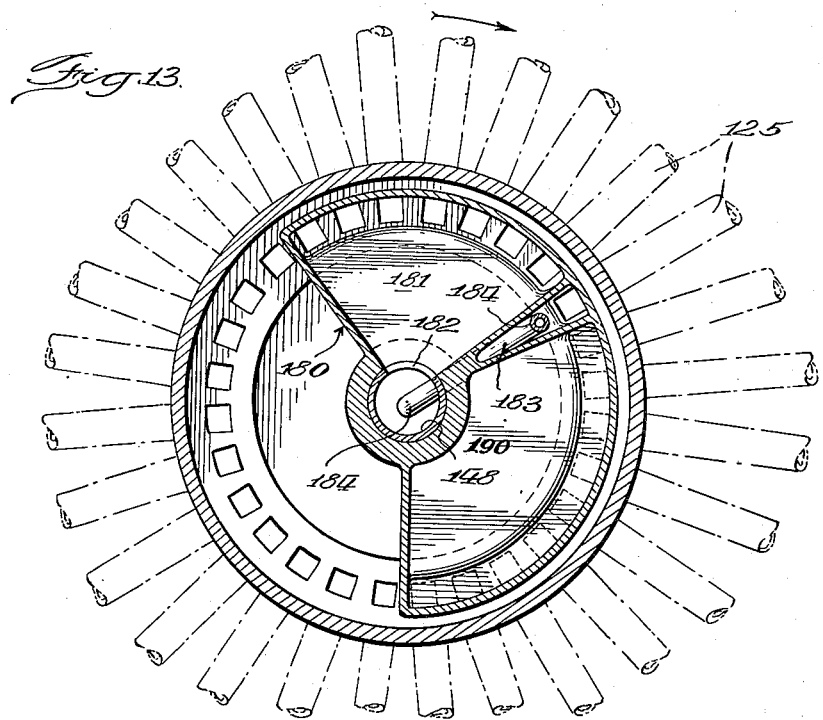
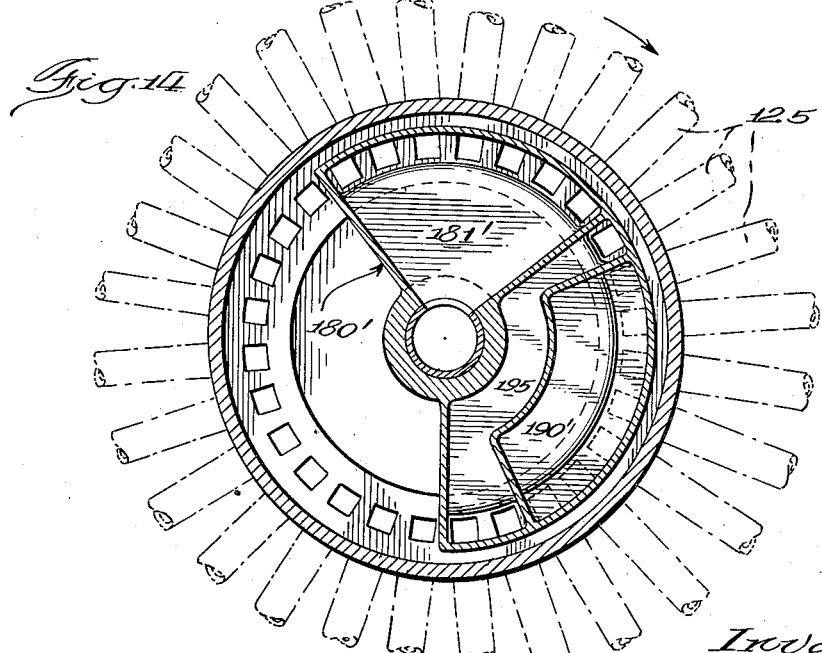

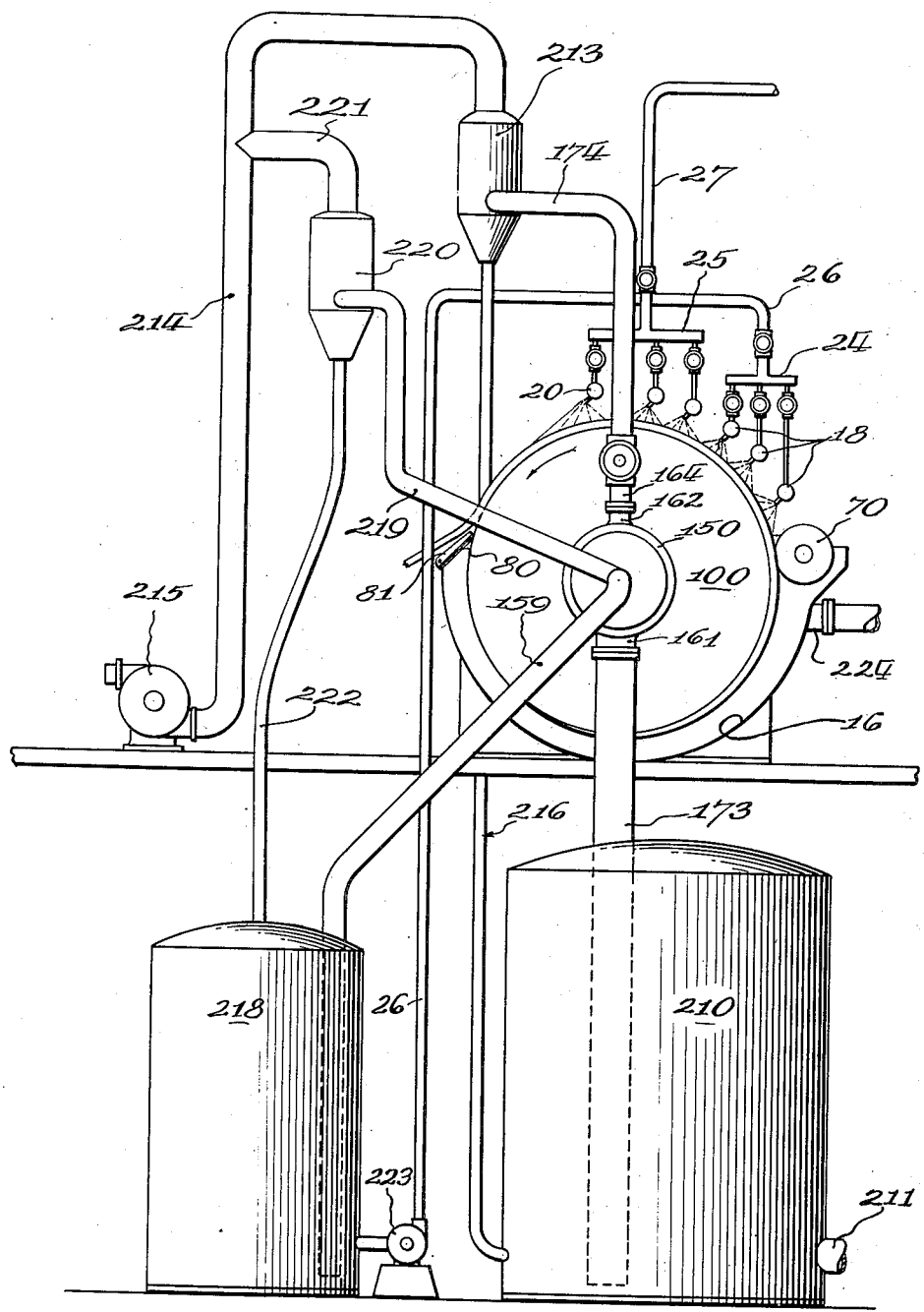

Patented Nov. 7, 1944

2,362,300

UNITED STATES PATENT OFFICE 2,362,300

FILTER

Carl Bernhard Nyman, Hull, Quebec, Canada, assignor to Swenson Evaporator Company, Harvey, Ill., a corporation of Illinois Application May 1, 1941, Serial No. 391,363

6 Claims. (Cl. 210—199)

My invention relates to filters.

It will be illustrated and explained as employed in the filtering and washing of chemical paper pulp, commonly referred to in the industry as either kraft, soda, or sulphite pulp.

Heretofore it has been the usual practice to wash the pulp between the digesters and the paper machines by passing it successively through a series of separate filters—or washers as they are generally called—each stage diluting the liquor contained in the pulp. This practice requires duplication of equipment and moreover necessitates re-pulping and re-pulping apparatus between washing stages.

Although multi-stage washing with a single drum filter is not entirely new, it has hitherto found only limited acceptance by the industry because of the many disadvantages and limitations which beset single drum multi-stage washers as they were known prior to my invention. One of the chief disadvantages of single drum multi-stage washers as they existed prior to my invention was their inability sharply to separate the weak from the strong wash liquors, as a result of which unduly large quantities of wash water were required, which in turn necessitated large evaporator capacity to handle the excessive volume of wash liquor.

A further disadvantage of previous single drum multi-stage washers was their failure securely to retain the sheet of pulp upon the drum because the back wash of liquor from the filter sections loosened the sheet of pulp from the filter drum.

The chief object or my invention is to provide a filter which may be satisfactorily employed as a multi-stage pulp washer.

Another object is to increase the hydraulic capacity of a drum filter.

Another object of my invention is uniformly to wash sheets of pulp upon a single drum by means of counter-current displacement washing.

A further object of my invention is to prevent the sheet of pulp from rolling off of the filter drum of single drum multi-stage washers during the initial operation thereof.

A further object of my invention is to permit sharper separation of the weak and strong wash liquors from single drum multi-stage washers, thereby requiring less liquor evaporator capacity, because of decreased wash water consumption.

A further object of my invention is to increase the completeness and velocity of liquor drainage from the filter compartments of a rotary filter or washer.

A further object of my invention is to permit multi-stage single drum counter-current washing of a sheet of pulp without disturbing the continuity of the sheet of pulp.

A further object of my invention is to prevent foaming of the wash liquors produced in counter-current pulp washing.

Other objects and advantages of my invention will later appear.

In the drawings:

Fig. 4 is a section taken on the line 4—4 of Fig. 1;

Fig. 5 is a section on the line 5—5 of Fig. 1;

Fig. 6 is a section on the line 6—6 of Fig. 1;

Fig. 7 is an enlarged cross section through a few of the drum sectors on the line 7—7 of Fig. 1;

Fig. 8 is a further enlarged detail;

Fig. 9 is an enlarged longitudinal section through a portion of one end of the drum;

Fig. 10 is an enlarged plan, partly sectioned, of a portion of the drum;

Fig. 11 is an enlarged plan of a drum-section drainage deck element;

Fig. 12 is an end elevation of a drainage deck element;

Fig. 13 is an enlarged section on the line 13—13 of Fig. 1;

Fig. 14 is a similar section of a modification; and

Fig. 15 is an elevation of a typical pulp washing plant employing my filter as a single drum multi-stage washer.

The filter or "pulp washer" according to my invention consists, in general, of three main elements as usual—namely, a rotatable filtering drum, a filter housing including a trough into which the drum dips, and power driving means for the drum. I shall describe these elements separately, in conjunction with the various apparatus appurtenant thereto.

Figure 1:
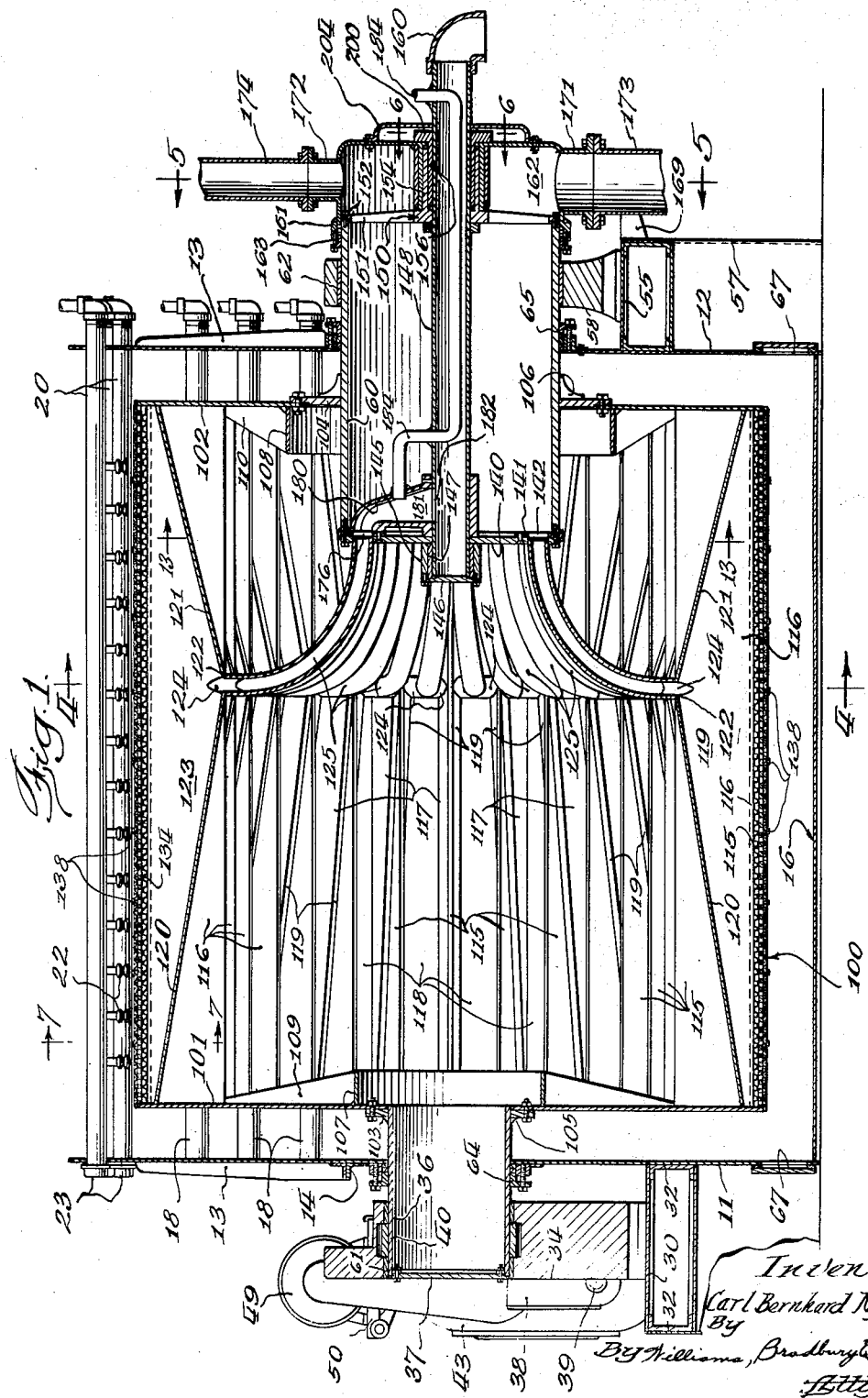
Fig. 1 is a vertical longitudinal section through my improved filter used as a single drum multi-stage pulp washer.
Figure 2:
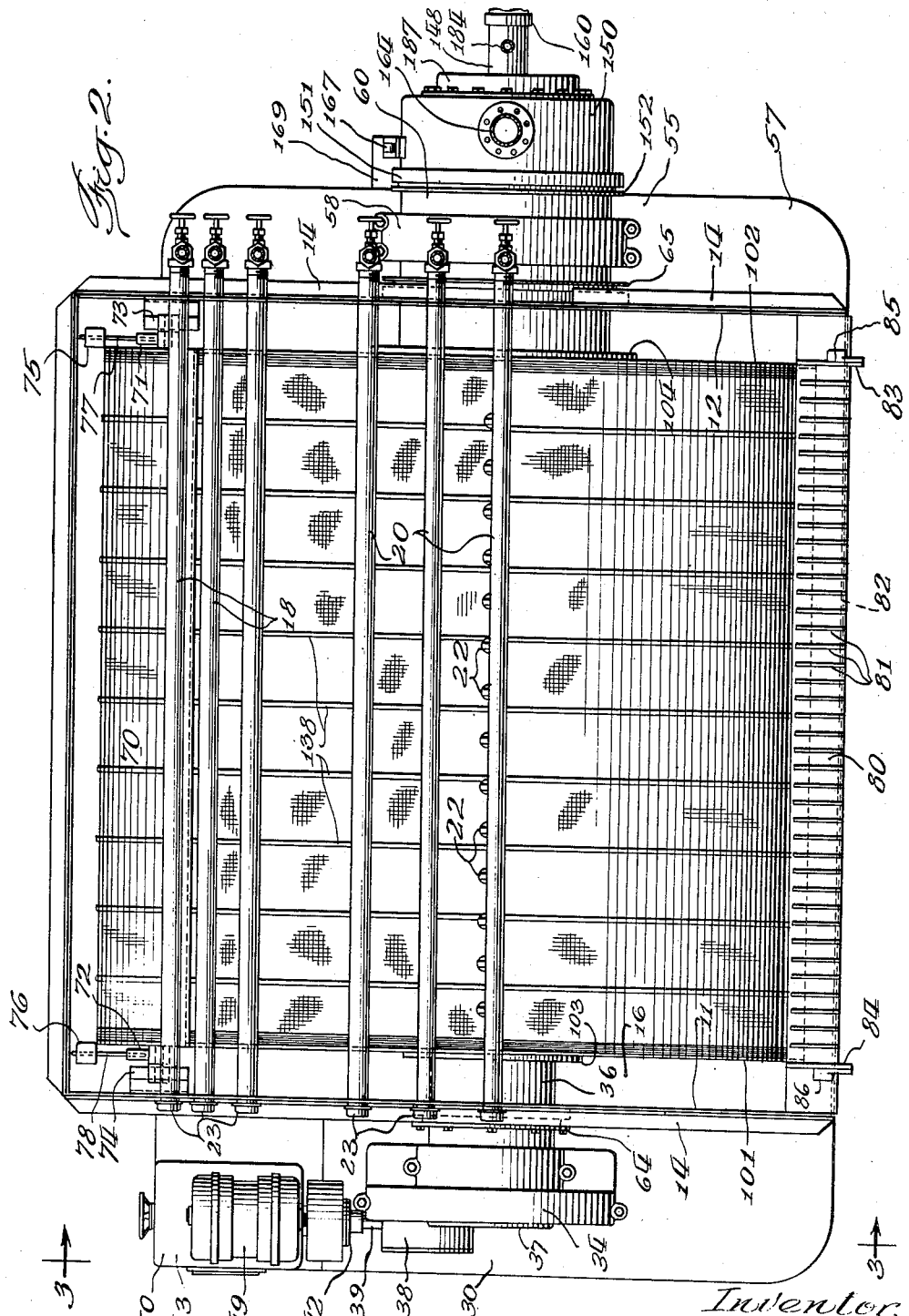
Fig. 2 is a plan view.
Figure 3:
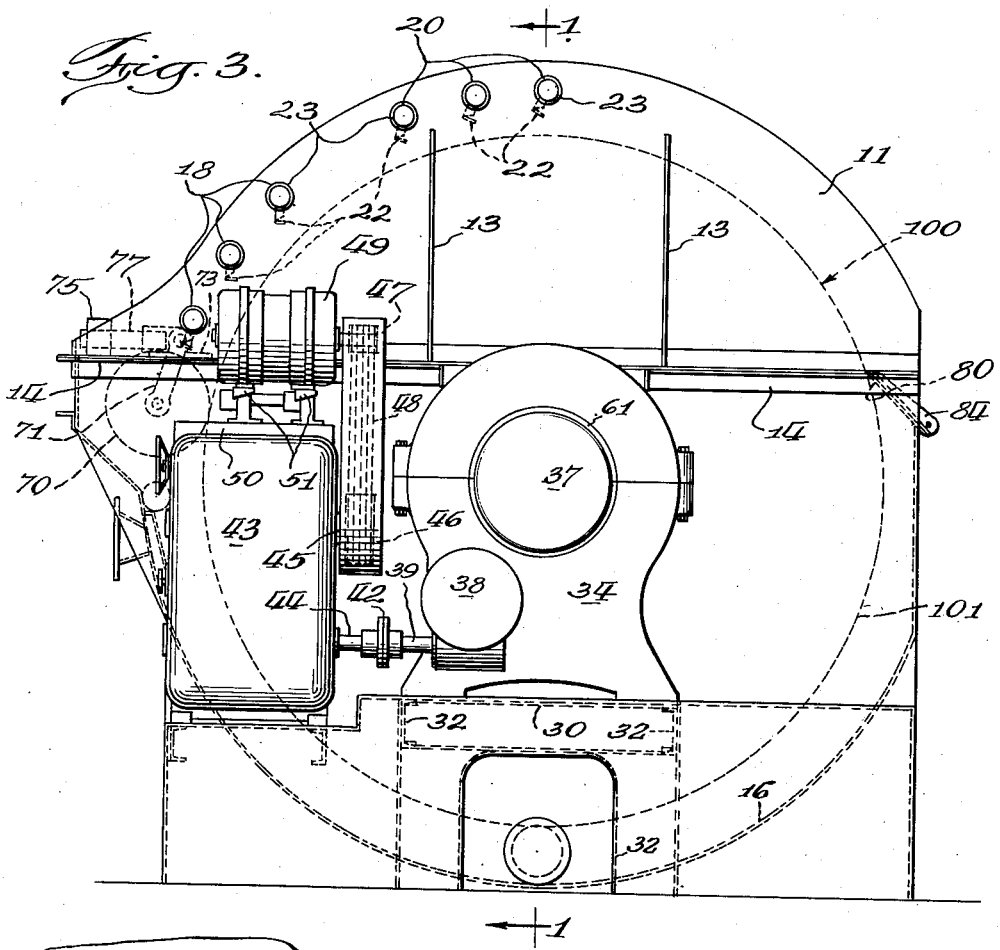
Fig. 3 is an end view along the lines 3—3 of Fig. 2.

The housing (Fig. 1) comprises two generally circular end plates 11 and 12, suitably reinforced by a number of welded on flanges 13 and angle irons 14 the lower halves of which end plates form the ends of a generally semi-circular trough 16 for holding the mixture or magma of pulp and liquor to be filtered and washed. The trough 16 is open at the top and above the ends thereof project the upper halves of the end plates 11 and 12, which, when the filter is used as a two-stage pulp washer, may support two groups of spray pipes 18 and 20 passing through openings spaced around the rim of the end plates. The spray pipes 18 and 20 are each fitted with a plurality of spray nozzles 22 spaced along the length of the pipes. As will be later explained, the nozzles of spray pipes 18 serve to distribute weak wash liquor uniformly over a predetermined portion of the surface of the filter drum whereas the nozzles of spray pipes 20 serve to distribute clear water upon another portion of the drum. The ends of the spray pipes are closed by means of caps 23. The spray pipes 18 are supplied with weak liquor and the spray pipes 20 are supplied with clear water from manifolds 24 and 25, respectively, which are connected to a weak liquor supply line 26 and a water supply line 27 respectively as will be later explained in connection with Fig. 15.

To the end plate 11 is fastened a shelf 30 supported upon a heavy structural steel base 32, upon which shelf rests the rear main bearing block 34 through which is journaled the rear trunnion 36 of the filter drum. The bearing block 34 contains speed reducing mechanism 38 for reducing the speed of rotation of the shaft 39 and for applying the power derived therefrom to the ring gear 40 of the trunnion 36. The shaft 39 is driven by the driving shaft 44 of the variable ratio speed reducer 43 to which it is connected by means of a flexible coupling 42. The driven shaft 45 of the speed reducer 43 is fitted with a multiple V-belt pulley 46 connected to a multiple V-belt pulley 47 of smaller diameter actuated by an electric motor 49 via a plurality of V-belts 48. The motor 49 is mounted upon an adjustable base 50, the wedges 51 of which can be manipulated to raise or lower the motor, thereby to tighten the V-belts 48. The several speed reducing means described are for the purpose of reducing the high speed of the motor 49 to the very low speed of only a few revolutions per minute demanded for the rotation of the filter drum 100. The variable ratio speed reducer 43 is employed for adjusting the speed of rotation of the filter drum 100 to suit the character of the pulp being washed.

To the end plate 12 is fastened a shelf 55 supported upon a heavy structural steel base 57 upon which shelf 55 rests the front main bearing block 58, through which is journaled the large forward strong-liquor outlet trunnion 60 of the filter drum. The rear and front trunnions 36 and 60 turn in sleeve bearings 61 and 62, respectively, carried by the bearing blocks 34 and 58, respectively. They also pass through rotary sleeve seals 64 and 65 mounted upon end plates 11 and 12, respectively. Each end plate 11 and 12 is fitted with a covered drainage opening 67 for draining the filter trough 16.

The end plates 11 and 12 provide support for a squeegee roll 70 journaled through the depending ends of two bell-crank levers 71 and 72 pivoted in pivot blocks 73 and 74, which are welded to the end plates 11 and 12, respectively. The squeegee roll 70 bears against the filtering surface of the filter drum 100 and helps to smooth the sheet of pulp formed thereupon as well as serving as a dam restraining the flow of weak wash liquor from the spray pipes 18 back into the trough 16. The pressure of the roll 70 toward the filter drum 100 may be varied by adjusting the position of the counter weights 75 and 76 upon the lever arms 77 and 78, which extend rearwardly from the levers 71 and 72, respectively. The squeegee roll 70 is preferably covered with filter cloth 79, such as is used upon the filter drum 100.

At the edge of the trough 16, at the side of the filter drum 100 opposite the squeegee roll 70, is located a scraper or "doctor blade" 80. The function of the doctor blade 80 is to lift the washed sheet of pulp off the periphery of the rotating filter drum 100 for delivery to a stock storage chest or re-pulper of usual type and which, for that reason, is not shown. The doctor blade is thin and is given rigidity by being screwed to a plurality of spaced fingers 81, the ends of which are bolted to a longitudinal angle iron 82. The edge of the blade 80 serves to remove the pulp from the filter drum and the fingers 81 support and guide the sheet of pulp as it leaves the drum. The end fingers 83 and 84 are adjustably pivoted to lugs 85 and 86 carried upon the upper rear edge of the trough 16.

The sharp leading edge of the doctor blade 80 clears the surface of the filter drum 100 sufficiently to lift the washed sheet of pulp therefrom without abrading the filter cloth. The doctor blade may be assisted in the removal of the washed sheet of pulp—or filter cake—as will later appear.

The filter drum 100 comprises two end plates 101 and 102, each provided with large central apertures through which pass trunnions 36 and 60 respectively. The end plates 101 and 102 are bolted to heavy flanges 103 and 104, welded to the trunnions 36 and 60 respectively, and further braced against lateral deflections by means of fillets 105 and 106 respectively. The end plates 101 and 102 are further reinforced laterally by heavy rings 107 and 108, respectively, welded to the inner faces of the end plates, from which rings emanate a plurality of radial webs 109 and 110, which are welded respectively, both to the rings 107 and 108, and to the end plates 101 and 102. The rear or driving trunnion 36 is closed by means of a man hole cover 37 which prevents access of air to the interior of the filtering drum 100, but which gives access thereto for maintenance purposes.

The filter drum 100 is divided into separated segmental sectors or sections—twenty-eight sections being shown in the filter or washer chosen for description. The separation into sectors is effected by radial partitions 115 which extend substantially from end to end of the drum. The peripheral or outer end of each sector is covered with a suitable filter medium supporting section 116 which also serves as a liquid-drainage deck and the preferred construction of which will be later explained. A hollow cell 117 lies within and fills most of the space of each sector. Each cell 117 includes an imperforate outer wall 118, which is preferably curved to correspond to the curvature of the drainage deck, two radial side walls 119, which are spaced equal distances from the sector partitions, and two bottom members, each of which, as shown most clearly in Fig. 1, consists of two longitudinally sloping portions 120 and 121 which converge upon an outlet 122. These outer walls 118, radial side walls 119 and sloping bottom members 120—121 extend the full length of the drum. The cells therefor subdivide each drum sector into a pair of long relatively narrow radially disposed drainage troughs 123, extending inwardly from and entirely along the opposite longitudinal edges of every drum sector or section. And each drainage trough merges into a hopper-like bottom, formed by the sloping bottom walls 120—121, which drains toward its outlet 122. The two outlets 122 of each drum section or sector are joined by a Y connection 124 to a common suction-drainage tube 125. There is, therefore, a suction-drainage tube 125 for each section connected to both of the spaced hopper bottomed drainage troughs thereof.

Referring now especially to Figs. 9 to 12, the filtration and filtrate drainage arrangement for the drum sections will be described.

As previously mentioned each drum sector or section has its outer larger end provided with a curved filter medium support and liquid drainage deck 116. This deck for each section comprises a corrugated sheet or plate of metal 130 which lengthwise of the drum fits in between the drum heads 101 and 102 and circumferentially of the drum fits in between the section radial partitions 115. It may be secured in place in any suitable manner as by welding it to the drum heads and, if desired, at intervals to the outer cell wall 118. It is curved to correspond to the desired curvature of the drum and, being circumferentially corrugated, forms a series of parallel ridges 131 and valleys 132 which, when the section is in place, run circumferentially of the drum. Thus the outwardly open valleys constitute a plurality of parallel channels along which filtrate may unobstructedly and smoothly flow; and the ridges, which open inwardly, constitute a plurality of parallel channels through which air may freely flow without interfering with or interference from the liquid flowing in the valleys. At each end each valley 132 is provided with an elongated slot 133 which, when the deck section is in place, register with the two radial drainage troughs 123 of the drum section. On the other hand, the corrugation ridges extend clear to the section partitions and are open on the underside to the associated drainage troughs. In addition thus to forming inverted air channels opening into the drainage troughs, these ridges or ribs 131 support a perforated metal grid plate 134 for each drum section, each such plate fitting longitudinally in between the drum heads and circumferentially in between the section partitions 115. These grid plates may be welded at intervals to the drainage deck sections and collectively they form the immediate backing and support for a "filter cloth" 135 of any appropriate variety. The filter cloth may be applied all in one piece, the edges at the drum heads being held in any desired manner, such as by several turns of wire 136 anchored to cap screws 137, as shown in Fig. 9. If desired the filter cloth may be held against the perforated grid intermediate its end anchorages by suitable circumferential metal bands 138.

Thus each drum section includes a peripheral curved drainage deck, spaced a short distance inwardly of the filter medium, and a pair of long radially disposed drainage troughs—one along each edge of the drainage deck. Each deck section includes a plurality of outwardly open filtrate channels which empty at opposite ends into drainage troughs and a plurality of inwardly opening air channels which serve, in effect, as vents for the air displaced from the drainage troughs as the troughs become filled with filtrate when the trough in which the drum rotates is initially filled. The inwardly opening air channels also serve as vents enabling the liquid in the trailing troughs to be removed faster. If the air channels were not provided, then, as the drum rotates to a position wherein the trailing trough is filled with liquid and air flows through the leading trough, liquid could flow only with difficulty from the trailing trough because, as it flows into the suction-drainage tube, a vacuum would tend to form in the upper portion of the trailing trough as a result of the resistance to air flow through the filter sheet. However, the air channels of the present invention prevent the tendency of a vacuum to form so that the liquid is more readily drained from the troughs. Each drainage trough is relatively narrow circumferentially of the drum—i. e., in the direction of drum rotation but radially relatively deep. And, as previously mentioned, the two hopper bottomed troughs of each section communicate with a common drainage tube 125.

The means and manner whereby the drainage tubes 125—and consequently the drum sectors—may be successively subjected to suction to facilitate the building of a filter cake upon the filter medium and to extract liquid therefrom and also, if desired, subjected to pressure to facilitate removal of the cake by the doctor blade will now be described.

Two arrangements for providing outward pressure upon the cake immediately in advance of the doctor blade are shown in Figs. 13 and 14. In the arrangement shown in Fig. 13 a steam jet is employed to provide this outward pressure at the desired time; in Fig. 14 the arrangement is such that air, compressed by the submergence of some sections, is utilized to afford the outward pressure at other unsubmerged sections.

The delivery tubes 125 converge upon a rotatable manifold plate 140 along smooth right-angled curves and have their ends secured to the plate in alignment with holes therethrough. This plate has a wear ring 141 secured thereto, the ring having an aperture 142—preferably of rectangular shape—aligning with and constituting a port for each delivery tube 125 opening in the manifold plate. The plate 140 is provided with a welded-on hub 145 covered with a cap 146 which prevents access of air to the trunnion 60. The hub 145 is fitted with a sleeve bearing 147 within which is journaled a weak liquor exhaust pipe 148. The weak liquor exhaust pipe 148 is centrally spaced within the trunnion 60 by means of a spider 150, the arms 151 of which are surrounded by a rim 152 bolted to the edge of the trunnion 60. The spider 150 is fitted with a hub 154 into which is fitted a sleeve bearing 156 through which is journaled the other end of the weak liquor exhaust pipe 148. Connection with a weak liquor exhaust line 159 may suitably be made by means of an elbow 160. The end of the trunnion 60 projects within the rim 161 of the main exhaust port 162. The rim 161 is provided with a bolted-on sealing ring 163 which prevents access of air to the trunnion 60 by leakage around the end thereof into the exhaust port 162. The main exhaust port 162 is cast with integral flanged pipe connections 171 and 172 to which are bolted respectively the flanged strong liquor exhaust pipe 173 and a suction line 174. The exhaust port 162 may be anchored against rotation by means of a tie rod 175 bolted to a channel member 176 carried by the pedestal 57 (see Fig. 5). Thus the interior of the trunnion 60 is in constant communication with suction and with the strong liquor exhaust pipe 173.

The weak liquor exhaust pipe 148 carries a distributor housing 180 which serves to control the sequential application of suction—and if desired also of pressure—to the ports of the delivery tubes 125 and, through these tubes to the drum sectors. The construction and function of this distributor housing 180 will be best understood by reference to Figs. 1 and 13. This housing, which lies within the trunnion 60, is carried by and secured to the stationary weak liquor exhaust pipe 148 so that it too is stationary. As a whole housing 180 is sector shaped and is of a size to embrace or overlap a considerable proportion of the ports of the drainage-suction tubes 125. In the particular arrangement chosen for illustration, all but eleven of the twenty-eight ports are overlapped by the distributor housing. These eleven ports, which at any given instant are not overlapped by housing 180, are in communication with trunnion 60 and thereby the drum sections associated therewith are subjected to suction from suction line 174 and connected to the strong liquor exhaust pipe 173. The distributor housing 180 has a face that makes a tight wiping contact with the front surface of the manifold or wear ring 141 and is by suitable inside partitions separated into a number of hollow compartments. Thus it includes a compartment 181 which, through an opening 182, is in communication with the weak liquor exhaust pipe 148. This compartment 181 flares out radially far enough to embrace a desired number of suction tube ports in the manifold ring 141. Consequently as the drum rotates, the ports of a certain number of delivery tubes 125 are successively in register with compartment 181 and are thereby connected to the weak liquor discharge pipe 148 and subjected to suction. Another compartment 183 of the distributor housing 180 may be provided to register with an aperture in manifold ring 141 which, in the direction of drum rotation, is in advance of the apertures registering with compartment 181. This compartment 183 is connected to a suitable source of pressure fluid—such as steam— by a pipe 184 which passes into the drum through the weak liquor exhaust pipe 148.

A third compartment 190 of the distributor housing 180 is arranged to close a certain number of suction pipe ports so that the drum sections connected to such ports are, when their ports are in register with this compartment, shut off from all suction, or pressure—even atmospheric pressure.

Thus as the drum rotates clockwise any particular drum section after it leaves the doctor blade is, with a certain number of other sections, blanked off until after it becomes submerged in the liquor-pulp mixture in trough 16. Thereafter, i. e., after having been blanked off for a time, a particular drum section, along with others, is connected to trunnion 60 during which time it is subjected to suction from suction line 174 and also connected to the strong liquor exhaust pipe 173. This connection obtains while a particular sector is submerged and for a time after submergence. While the section is submerged and subjected to this suction the cake builds up on the filter medium over its outer end. After it rises above the level of the liquor-pulp mixture in the filter trough, the suction begins to withdraw the strong liquor from the cake over its outer end. Later and while still in communication with the chamber of trunnion 60, the section passes in front of the weak liquor spray from spray pipes 18 with the result that the cake is washed with weak liquor. Between the sprays from pipes 18 and 20 the port of the section discharge pipe comes into register with compartment 181 of the distributor housing whereupon it is rapidly transferred from the suction and drainage connection with trunnion 60 to the suction and drainage connection with weak liquor pipe 148. Just after this transfer is effected the section passes in front of the clear water spray pipes 20 with the result that the cake is now washed with clear water and the weak liquor resulting from this dilution is removed through pipe 148. Just before the section reaches the doctor blade, its port registers with compartment 183 of the distributor housing whereupon a blast of steam or other pressure fluid rushes out through the section drainage troughs back of the cake to loosen it from the filter cloth and make it easier for the doctor blade to remove it.

If the cake-loosening outward pressure is to be derived from the compression of air within submerged sections, the modification shown in Fig. 14 may be employed. In general, the arrangement of the distributor housing 180' is the same as previously described. It has a compartment 181' which successively connects a group of sections to the weak liquor drainage pipe 148 and a compartment 190' which blanks off another group of sections. Those ports which are not at any one time bridged by housing 180' are connected to trunnion 60 as previously explained. Instead, however, of having a compartment connected to a steam pipe or other external source of fluid pressure, it has a compartment or passage 195, which, as the drum rotates will successively connect some of the submerged sections—two such sections are shown—with an unsubmerged section immediately in advance of the doctor blade. With this arrangement the air, which is trapped in the drum sectors at the time their outer ends become completely submerged in the liquor-pulp magma in trough 16, is compressed by the section's further submergence. And when the sections are by compartment 195 connected to an unsubmerged section—preferably one that is approaching the doctor blade—this compressed air is released outwardly through that unsubmerged section with a lifting and loosening effect upon the filter cake over the peripheral end thereof.

In order to prevent rotation of the pipe 148 and the distributor housing 180 (or housing 180'), as well as to provide means for adjusting the angular position of the housing relative to the drainage tube ports, the weak liquor exhaust pipe 148 is provided with a collar 200, having a sidewardly extending lug 201 (Fig. 6), which is held between two set screws 202 screwed through lugs 203 welded to the outer wall of the exhaust port, 162. The desired adjustment of the angular position of the distributor housing is protected against molestation by means of a cover 204 bolted over the end wall of the exhaust port 162. By adjusting the angular position of the distributor housing, the location in the cycle of drum rotation of the regions of sequential connection of the various drum sections to trunnion 60 (through which communication is made to suction and strong liquor discharge), to weak liquor pipe 148 (through which communication is made to suction and the weak liquor discharge), of pressure (in either of the ways heretofore described) and the blanking off of other sections from either suction or pressure may be altered. Of course, it will be understood that the distributor housing may be designed to register with a lesser or greater number of drainage tube ports and to dispense with the pressure arrangement, if desired.

The pulp filter or washer described above is operated in conjunction with the required number of pumps and liquor storage tanks to provide a complete single drum multi-stage pulp washing unit (Fig. 15) having a washing capacity substantially equal to the three separate units hitherto deemed necessary. Strong liquor is led by pipe 173 into a strong liquor storage tank 210 from whence it may be pumped via pipe 211 to multiple effective evaporators or otherwise disposed of, as desired. The exhaust pipe 174 leads into a suitable liquid trap 213 connected to a vacuum pump 215 via pipe 214. Small amounts of strong liquor separated from the exhaust in the trap 213, are returned to the strong liquor tank 210 via pipe 216. Weak liquor leaving the weak liquor exhaust pipe 148 via elbow 160 passes along pipe 159 into the weak liquor storage tank 218. Suction may be imparted to the weak liquor exhaust pipe 148 from suction pump 215 by leading therefrom a suction line 219 to a liquid trap 220 which in turn is connected to the suction line 214 of exhaust pump 215 by a pipe 221. The weak liquor separated from the suction exhaust by trap 220 may be led by a pipe 222 to the weak liquor storage tank 218. The weak liquor storage tank 218 serves as a temporary reservoir from which weak liquor is continuously supplied to the weak liquor spray pipes 18 by means of a pump 223, feeding into the weak liquor supply line 26. The clear (and preferably hot) water spray pipes 20 are connected to a water supply line 27. Stock is admitted to the filter trough 16 via the flanged inlet pipe 224.

Briefly reviewed, the operation of the apparatus is as follows: As the filter drum 100 revolves in the trough 16, pulp is accumulated upon the submerged surface of the drum under the influence of the suction to which the submerged drum-sectors are subjected. This suction is induced by pump 215 through the suction line 164 and the hollow trunnion 60 which, through the uncovered ports 142, is in communication with the drainage tubes 125 of the submerged drum sections. This suction through trunnion 60 is continued upon each drum section from shortly after its submergence in the pulp-liquor magma contained in the filter trough until shortly after the section passes beyond the weak liquor spray from pipes 18.

When a section leaves the liquor-pulp mixture in the filter trough in its ascending travel as the drum rotates, the liquor withdrawn by the suction flows more or less as a series of thin streams down the curved drainage deck 116 of that sector or section into the coextensive lower drainage trough 123 of the trough pair associated therewith. On the other hand the higher drainage trough 123 of the ascending sector is relatively free of liquor so that the suction therethrough tends more effectively to extract liquor from the cake and thereby more rapidly withdraw the strong liquor therefrom. This segregation within the drum sections of liquid and air or other noncondensible gases that may be present also very materially lessens the tendency to foam, because there is not the opportunity for the liquid and gas to commingle. During part of this ascending travel the cake adhering to the drum periphery is given its first stage of washing by weak liquor from the spray pipes 18. At some point between the weak liquor spray from pipes 18 and the fresh water spray from pipes 20 a section has the port of its delivery tube 125 transferred by distributor housing 180 from communication with trunnion 60 to communication with the weak liquor exhaust pipe 148. Thereupon for the travel of the sector while its delivery tube is in communication with the weak liquor exhaust pipe 148—during at least part of which travel the filter cake on the cloth thereof is going through the second stage of washing by being sprayed with fresh water from pipes 20—it is draining into the weak liquor exhaust pipe and the resultant liquor is conveyed to the weak liquor storage tank 218 for re-use in the first stage of washing. This transition from communication with trunnion 60 to communication with exhaust pipe 148 takes place abruptly and quickly because of the circumferential narrowness of the drainage troughs 123 with the result that the separation between the first and second stages of washing is abrupt and well defined. For this reason the liquors withdrawn from the cake during the two washing stages are not commingled to an objectionable extent and better washing with less clear water is obtained. Also the amount of weak liquor required during the first stage is less, with the result that the strong liquor extracted through trunnion 60 is not so much diluted and the quantity requiring concentration in the evaporators is less. After a sector or section reaches the zenith and starts the descending path of its travel, it is still subjected to suction from the weak liquor exhaust pipe 148 and is discharging to the weak liquor storage tank 218. During this stage of its descending path the tendency of the liquor which may remain in the drainage troughs and discharge tube to surge outwardly into the filter cake again, is reduced partly because the main volume of liquor in the section is down in the lower drainage trough and discharge tube thereof removed a considerable distance from the periphery and the cake and partly because the suction is acting on the liquor in the narrow drainage trough with a greater effect to retain it there away from the filter cake.

Shortly before a section reaches the doctor blade its discharge tube 125 is cut off from communication with suction and connected to a pressure source so that either a jet or steam or air is projected outwardly therethrough to loosen—possibly even slightly to elevate—the cake from the filter medium so that the doctor blade may more easily remove it.

The actions of picking up filter cake, first stage washing by spraying with weak liquor and withdrawing strong liquor, second stage washing by spraying with clear water and withdrawing weak liquor, and of the jets of pressure fluid—either steam from an external source or air compressed by submergence of a drum section and its transient connection to an unsubmerged section, or both—which have been described as for one section of the drum, takes place sequentially for all of the sections as the drum rotates. Strong liquor is continually being withdrawn from the sections and flows via the delivery tubes 125, the front trunnion 60, and the pipe 173 into the strong liquor storage tank 210. By the time sections pass above the squeegee roll 70 a thick porous sheet of pulp has formed upon the filter drum. The sheet is smoothened and compacted by the pressure of the heavy squeegee roll 70. Immediately upon emerging from beneath the squeegee roll, the sheet of pulp is subjected to a spray of weak liquor from the weak liquor spray pipes 18, which displaces the strong liquor in the sheet of pulp, and the relatively strong liquor is withdrawn by suction and flowed to the strong liquor tank 210 from which it may be delivered to suitable evaporators. Upon emerging from the weak liquor spray, the sheet of pulp is subjected to a spray of clear water from the spray pipes 20 and the resultant relatively weak liquor is withdrawn and flowed to the weak liquor tank 218. Upon emerging from the clear water spray, and after being subjected to suction for a sufficient length of time to permit adequate removal of the moisture, the washed sheet of pulp is taken off of the filter drum by the doctor blade 80 having first been loosened, if desired, by one or both the steam or air jets.

The position of the distributor housing 180 with respect to the suction tube ports may be adjusted so that practically all of the weak wash liquor resulting from the washing of the sheet of pulp by the clear water from spray pipes 20 as well as a small portion of the strong liquor is sent to the weak liquor storage tank. All of the strong liquor filtered through the sheet of pulp while it is submerged in the filter trough 16 as well as the most of the strong liquor washed from the sheet of pulp by the weak liquor spray pipes 18 is sent to the strong liquor storage tank. The distribution of the weak and strong liquors, and consequently their composition, is readily variable by adjusting the set screws 202 which control the angular position of the distributor housing 180. Actual experience has demonstrated that my single drum multi-stage washer requires only about half as much washwater as an equivalent multiple drum installation. Consequently, I obtain much stronger liquor, which requires less steam for evaporation, and a considerably smaller evaporator capacity.

Having thus illustrated and described a typical embodiment of my invention, what I claim and desire to secure by United States Letters Patent is as follows:

1. A filter of the type including a trough adapted to contain liquid, a rotatable drum subdivided into a plurality of sectors which are successively submerged in and withdrawn from liquid in the trough, each sector being constructed and arranged so that air is trapped and compressed therein when its is submerged in the liquid, and means for blanking off sectors during the initial portion of their submergence and thereafter applying suction to them for a portion of their rotation, characterized by the provision of means associated with said blanking and suction applying means for successively interconnecting submerged blanked-off sectors with unsubmerged sectors, whereby the air trapped and compressed upon submergence is utilized to press outwardly against and to loosen the filter cake.

2. A filter of the type including a trough adapted to contain liquid, a rotatable drum subdivided into a plurality of sectors which are successively submerged in and withdrawn from liquid in the trough, each sector being constructed and arranged so that air is trapped and compressed therein when it is submerged in the liquid, means for blanking off sectors during the initial portion of their submergence and thereafter applying suction to them for a portion of their rotation, and a doctor blade for removing filter cake from unsubmerged sectors, characterized by the provision of means associated with said blanking and suction applying means for successively interconnecting submerged blanked-off sectors with unsubmerged sectors immediately in front of the doctor blade, whereby the air trapped and compressed upon submergence is utilized to facilitate removal of the filter cake by the doctor blade.

3. A drum for a rotary drum type filter comprising a plurality of radial partitions dividing the drum into sectors; a hollow cell filling most of each sector, each cell including two radial side walls spaced from opposite sides of adjacent partitions to form a circumferentially narrow but radially deep drainage trough along each longitudinal edge of the sector, a curved outer wall bridging the radial side walls near the periphery of the drum and having openings disposed generally above the troughs, and a pair of sloping bottom walls each of which extends between one of the radial side walls and the adjacent partition to form a hopper bottom for its associated drainage trough, each hopper bottom being deepest at and having a drainage outlet in the longitudinal central region of the drum; a filter medium on the periphery of the drum; and a plurality of suction-drainage tubes, each tube being connected to the drainage outlets of the two drainage troughs of one of the drum sectors.

4. A rotary drum filter of the type wherein the drum is subdivided into a plurality of sectors having filter medium across the outer ends, drainage decks spaced inwardly a short distance from the filter medium, hopper bottomed drainage troughs along longitudinal edges of the drainage decks, and drainage tubes connected to the low points of drainage troughs; characterized by the fact that each drainage deck comprises structure extending across the sector and defining circumferentially disposed parallel passages, certain of said passages being on the outer side of the deck and facing toward the filter medium and each communicating with the drainage troughs in the regions above the troughs for the passage of liquid filtrate along the deck to the drainage troughs, and others of said passages being located on the inner side of the deck and each communicating with said drainage troughs at the underside of the deck.

5. A rotary drum filter of the type wherein the drum is subdivided into a plurality of sectors having filter medium across the outer ends, drainage decks spaced inwardly a short distance from the filter medium, hopper bottomed drainage troughs along longitudinal edges of the drainage decks, and drainage tubes connected to the low points of the drainage troughs; characterized by the fact that the drainage decks are composed of sheets extending circumferentially across the sectors and formed with circumferentially parallel corrugations, the inwardly disposed valleys formed by the corrugations constituting passages for the filtrate and having openings in the valleys above the troughs for the drainage of the filtrate into the troughs, and the ridges formed by the corrugations constitute inverted passages communicating with and interconnecting the drainage troughs.

6. A filter of the type having a rotatable drum subdivided into a plurality of sectors which during different limited arcs of drum rotation are successively submerged in and withdrawn from the liquid being filtered, each sector having a suction-drainage tube connected thereto, a manifold with which the suction drainage tubes register during drum rotation constructed to blank off tubes and their corresponding sectors upon and during an initial portion of their submergence and thereafter to apply suction to said tubes and their corresponding sectors, and a doctor blade for removing solid-cake from unsubmerged sectors, characterized by the provision of the manifold with a passage which successively interconnects the suction-drainage tubes of at least two sectors, said passage being so located that one of the interconnected sectors is submerged and has been blanked off until the tube corresponding thereto is connected to said passage and the other is unsubmerged and immediately in front of the doctor blade.

CARL BERNHARD NYMAN.